(No Model.) 2 Sheets—Sheet 1.

S. S. SERGEANT.
CORRUGATING MACHINE.

No. 583,403. Patented May 25, 1897.

Witnesses:
W. J. Jacker,
E. A. Duggan.

Inventor:
Samuel S. Sergeant
By Chas. C. Tillman
Atty.

THE NORRIS PETERS CO., PHOTO-LITHO., WASHINGTON, D. C.

(No Model.) 2 Sheets—Sheet 2.
S. S. SERGEANT.
CORRUGATING MACHINE.
No. 583,403. Patented May 25, 1897.
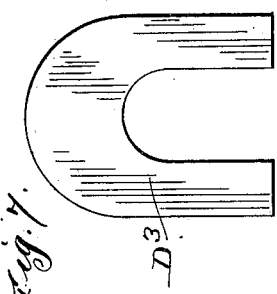
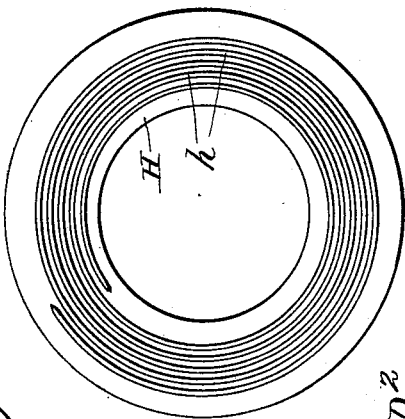
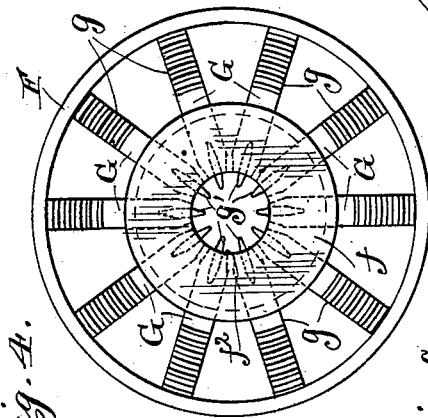
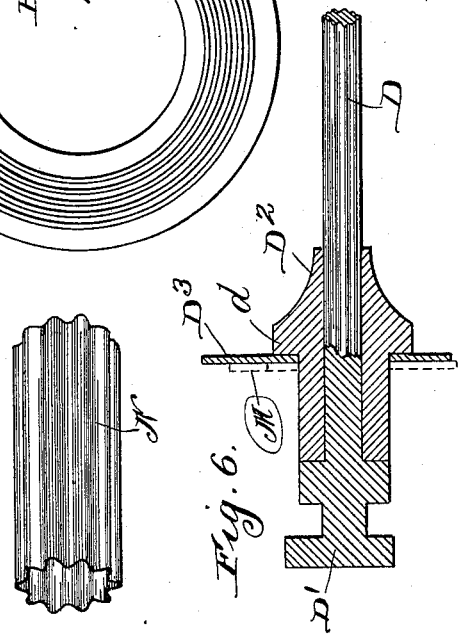
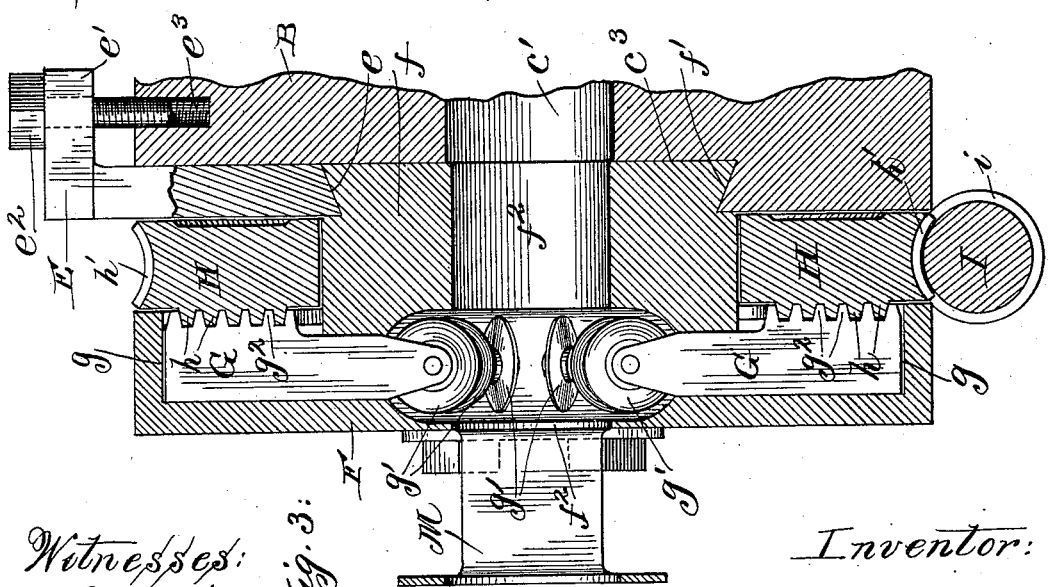
Witnesses:
R. J. Jacker,
C. A. Duggan.
Inventor:
Samuel S. Sergeant
By Chas. C. Tillman Atty.

United States Patent Office.

SAMUEL S. SERGEANT, OF CHICAGO, ILLINOIS.

CORRUGATING-MACHINE.

SPECIFICATION forming part of Letters Patent No. 583,403, dated May 25, 1897.

Application filed September 19, 1896. Serial No. 606,333. (No model.)

*To all whom it may concern:*

Be it known that I, SAMUEL S. SERGEANT, a citizen of the United States, residing at Chicago, in the county of Cook and State of Illinois, have invented certain new and useful Improvements in Corrugating-Machines, of which the following is a specification.

This invention relates to improvements in a machine to be used for corrugating pipe or tubing after the said pipe or tubing has been made; and it consists in the novel features of construction and the new combination or arrangement of devices hereinafter described and claimed, whereby the tubing or pipe is provided with longitudinal corrugations.

The objects of my invention are, first, to provide a machine for corrugating pipe or tubing which shall be simple and inexpensive in construction, strong and durable, and effective in operation, and which will form the corrugations with uniformity and in a rapid and easy manner, and, second, such a machine which may be so adjusted as to operate on the pipe or tubing with uniform pressure at the various points where the corrugations are being formed and to produce all of the corrugations at the same time and of any dimensions desired.

In order to enable others skilled in the art to which my invention pertains to make and use the same, I will now proceed to describe it, referring to the accompanying drawings, in which—

Figure 1:
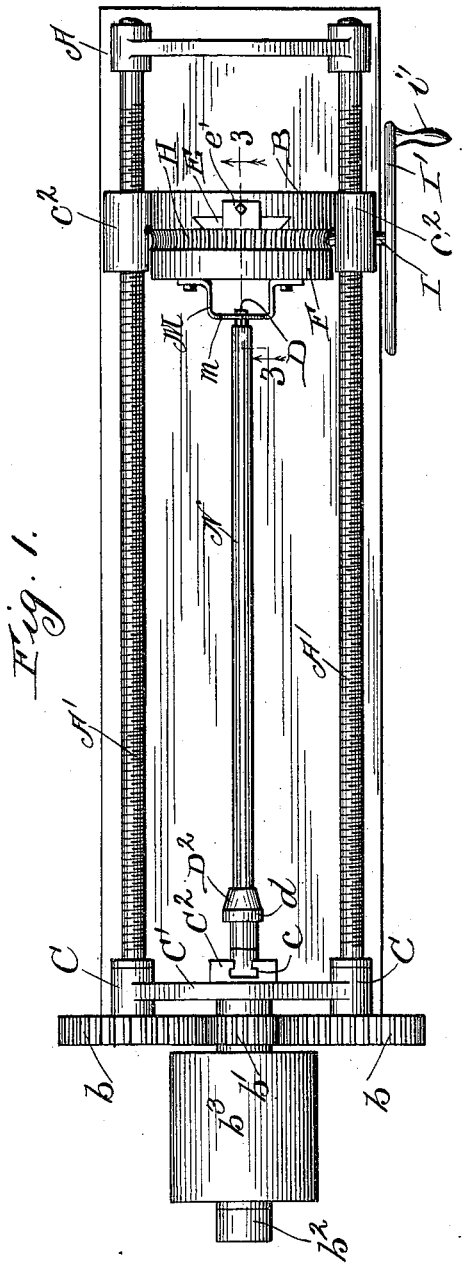
Figure 2:
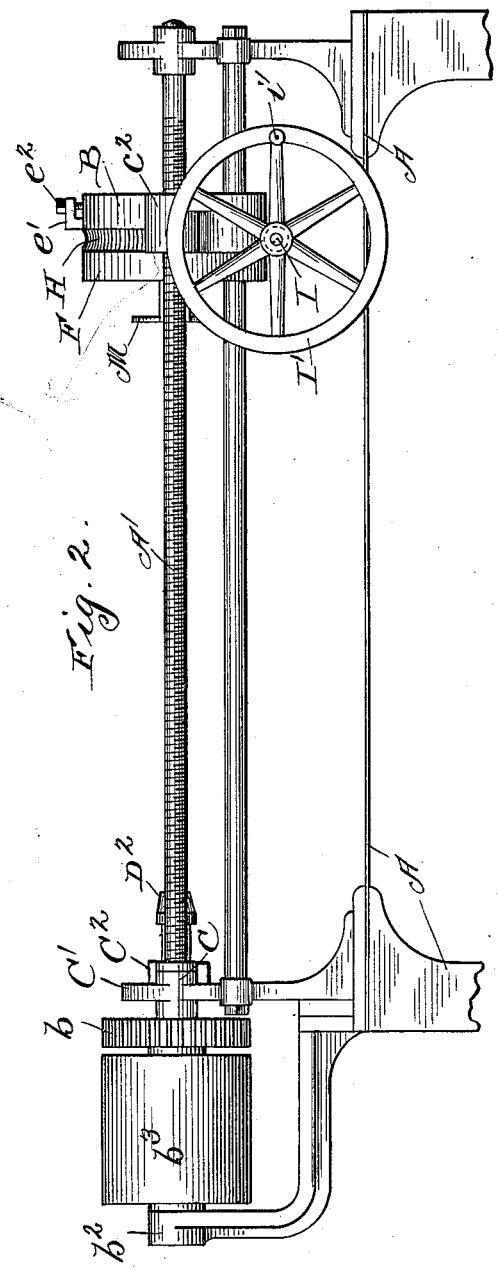

Figure 1 is a plan view of the machine, showing it mounted on a frame or support. Fig. 2 is a view in side elevation thereof. Fig. 3 is an enlarged sectional view taken on line 3 3 of Fig. 1, showing the corrugating mechanism and the means for adjusting the same on the pipe or tubing. Fig. 4 is a face view of the guide-disk and its adjustable corrugating-rollers. Fig. 5 is a like view of a spiral or convolute gear used for adjusting the bars or pieces carrying the corrugating wheels or rollers. Fig. 6 is a longitudinal sectional view, partly in elevation, of a portion of the core or mandrel, showing a sleeve thereon for removing the pipe or tubing after it shall have been corrugated. Fig. 7 is a detail view of a piece employed for engaging the sleeve shown in Fig. 6 when it is desired to remove the tubing from the mandrel, and Fig. 8 is a perspective view of a portion of a tube as it appears after being corrugated.

Similar letters refer to like parts throughout the different views of the drawings.

A represents the main or supporting frame, upon and at the ends of which are mounted in suitable bearings the screw-shafts A', used for operating the traveler or carriage B, which carries the corrugating mechanism. On one end of each of the screw-shafts is secured a cogged gear $b$, which meshes with a pinion $b'$, mounted on a shaft $b^2$, which shaft is journaled on the main frame and is provided with a pulley $b^3$, to which the driving power may be applied by means of a belt or otherwise.

Near the end of each of the screw-shafts A', on which are mounted the gears $b$, is secured a collar C, which collars are united by means of a cross-piece C', having on its front central portion an enlargement $C^2$, which is provided with a recess or slot $c$ for the reception and retention of the secured end of the mandrel D, which is formed, as shown in Fig. 6 of the drawings, with an enlargement D' to fit within said recess or slot, which is usually T-shaped, but may be of any other suitable form to securely hold the mandrel in position. This mandrel is corrugated, as shown in Fig. 6, and has on its corrugated portion a sleeve $D^2$, which is adapted to slide thereon and to remove the tube or pipe after it has been corrugated. The sleeve $D^2$ is formed with an annular enlargement $d$ to engage the bifurcated piece $D^3$, which is used when it is desired to remove the tubing or pipe from the mandrel. The traveler or carriage B is usually circular in form and has through its center an opening $c'$ for the passage of the mandrel and tubing, and is provided on its sides with screw-threaded portions $c^2$, through and with which the screw-shafts A' pass and engage. In the face or surface of the traveler B, adjacent to the corrugating mechanism, is formed an inwardly-beveled slot or opening $c^3$, which is circular in its lower portion and open at its upper part to receive a clamp E, the lower portion of which is beveled, as at $e$, to engage the hub $f$ of the disk F, which carries the corrugating mechanism. The upper portion of the clamp E is provided with an extension $e'$, through which is passed a set-screw $e^2$, which engages the screw-threaded opening $e^3$ in the upper part of the traveler or carriage, so that said clamp may be tightened on the hub $f$ of the disk F, which hub is provided with a beveled recess $f'$ on its periphery adjacent to the traveler. The disk F and its hub are formed with a central opening $f^2$ to admit of the passage of the mandrel and tubing, and said disk and its hub are provided with radial slots or guideways $g$ for the reception and operation of the adjustable bars G, each of which has journaled in its end adjacent to the central opening in the disk or hub a roller $g'$, which is beveled on its periphery and contacts with the tubing or pipe when the corrugations are being formed therein. On their surfaces adjacent to the traveler or carriage B each of the bars G is formed with gear-teeth $g^2$ to engage the spiral or convolute gear $h$ on the scroll and worm-gear H, located on the hub of the disk, and which gear is provided on its periphery with curvilinear gear-teeth $h'$ to engage a worm-gear $i$ on the shaft I, which has its bearings on the lower portion of the traveler, and is provided at one end with a wheel I' and handle $i'$ for turning the same.

On the outer surface of the disk or plate F and extending over the central opening therein is a yoke or bracket M, which is provided with an opening $m$ through its middle portion, which is somewhat larger in diameter than the opening $f^2$ in the disk, so that when the traveler carrying the disk and corrugating mechanism is retracted or drawn to the ends of the screw-shafts on which are located the gears $b$ the said bracket or yoke will pass over and beyond the enlargement $d$ on the sleeve $D^2$ by reason of its enlarged opening until it (the bracket) strikes the enlargement $C^2$ on the cross-piece C', when the bifurcated piece $D^3$ may be placed astride the sleeve $D^2$ and between the bracket and the shoulder or enlargement $d$ on the sleeve, (see Fig. 6,) in which figure the bracket is indicated by dotted lines. When in such a position, the machinery may be reversed, which will cause the traveler to move toward the opposite end of the frame, which operation will carry or slide the sleeve $D^2$ on the mandrel D and remove the corrugated pipe or tube N therefrom.

The operation of my machine is simple and as follows: The mandrel D is secured in the enlargement $C^2$ on the cross-piece C' or at one end of the frame and extends longitudinally and parallel with the screw-shafts. The sleeve $D^2$ is then placed on the mandrel and located at its secured end, as shown in Figs. 1 and 2 of the drawings. The piece of pipe or tubing is then placed on the mandrel, when power may be applied to the pulley $b^3$, which will cause the screw-shafts to revolve and retract the traveler carrying the corrugating mechanism, so that the rollers thereof may be caused to contact with the outer surface of the tubing or pipe and their pressure regulated by turning the worm-shaft I, which meshes with the gear-teeth on the periphery of the gear H, whose spiral or convolute gear $h$, as before stated, engages the teeth $g^2$ on the adjustable bars G, which carry the corrugating rollers or wheels. When the traveler carrying the corrugating mechanism shall have been retracted to the secured end of the mandrel, the forked piece $D^3$ may be placed astride of the sleeve $D^2$ between the enlargement $d$ thereon and the bracket M, when the machinery may be reversed to cause the traveler to move in the opposite direction and carry with it the said sleeve, which will contact with the end of the corrugated tube and remove it from the mandrel, as is apparent.

Having thus fully described my invention, what I claim as new, and desire to secure by Letters Patent, is—

1. The combination with a main frame, of screw-shafts journaled thereon, a device to operate said shafts, a traveler or carriage mounted on the screw-shafts, a series of bars radially arranged on the traveler and having gear-teeth, a corrugating-wheel journaled on each of the bars, a spiral gear to engage the teeth on said bars and a device to turn the spiral gear to force and hold the corrugating-wheels in contact with the pipe or tubing, substantially as described.

2. The combination with a main frame, of screw-shafts journaled thereon, a device to operate said shafts, a traveler or carriage mounted on the screw-shafts, a series of bars radially arranged on the traveler and having gear-teeth, a corrugating-wheel journaled on each of the bars, a spiral and worm gear on the traveler to engage the said bars and a worm-shaft respectively, and the said worm-shaft journaled on the traveler and having a device to turn it, substantially as described.

3. The combination with a main frame, of a traveler or carriage movably mounted thereon and having a central opening, a yoke or bracket secured to the traveler and having an opening in alinement with the opening in the traveler, a series of bars radially arranged on said traveler and having gear-teeth, a corrugating-wheel journaled on each of the bars, a spiral gear to engage the teeth of the bars and a device to turn the spiral gear to force and hold the corrugating-wheels in contact with the pipe or tubing, a mandrel secured at one of its ends and adapted to extend through the openings in the yoke and carriage, a sleeve located on the mandrel and provided with an enlargement, and a piece to engage said sleeve and yoke, substantially as described.

4. The combination with a main frame, of a traveler movably mounted thereon and having a central opening, a yoke or bracket secured to the traveler and having an opening in alinement with the opening in the traveler, a series of bars radially arranged on the traveler and having gear-teeth, a corrugating-wheel journaled on each of the bars, a spiral and worm gear on the traveler to engage the said bars and a worm-shaft respectively, said worm-shaft journaled on the traveler and having a device to turn it to adjust the corrugating-wheels on the tube or pipe, a mandrel secured at one of its ends and adapted to extend through the openings in the yoke and traveler, a sleeve located on the mandrel and a piece to engage said sleeve and yoke, substantially as described.

5. The combination with a main frame, of screw-shafts journaled thereon, a device to operate said shafts, a traveler or carriage mounted on the screw-shafts and provided with a central opening, a yoke or bracket secured to the traveler and having an opening in alinement with the opening in the traveler, a series of bars radially arranged on said traveler and having gear-teeth, a corrugated wheel journaled on each of the bars, a spiral gear to engage the teeth of the bars and a device to turn the spiral gear to adjust the corrugating-wheels on the tubing or pipe, a mandrel secured at one of its ends and adapted to extend through the openings in the yoke and traveler, a sleeve located on the mandrel and a piece to engage said sleeve and yoke, substantially as described.

6. The combination with a main frame, of screw-shafts journaled thereon, a device to operate said shafts, a traveler or carriage mounted on the screw-shafts and having a central opening, a yoke or bracket secured to the traveler and having an opening in alinement with the opening in the traveler, a series of bars radially arranged on the traveler and having gear-teeth, a corrugating-wheel journaled on each of the bars, a spiral and worm gear on the traveler to engage the said bars and a worm-shaft respectively, said worm-shaft journaled on the traveler and having a device to turn it to adjust the corrugating-wheels on the tubing or pipe, a mandrel secured at one of its ends and adapted to extend through the openings in the yoke and traveler, a sleeve located on the mandrel and a piece to engage said sleeve and yoke, substantially as described.

SAMUEL S. SERGEANT.

Witnesses:
CHAS. C. TILLMAN,
E. A. DUGGAN.